United States Patent [19]

Malone

[11] Patent Number: 4,517,497

[45] Date of Patent: May 14, 1985

[54] CAPACITOR DISCHARGE APPARATUS

[75] Inventor: Edgar W. Malone, Goleta, Calif.

[73] Assignee: Reynolds Industries Inc., Los Angeles, Calif.

[21] Appl. No.: 548,196

[22] Filed: Nov. 2, 1983

[51] Int. Cl.³ .............................................. H05B 37/00
[52] U.S. Cl. ................................. 315/241 R; 315/71; 315/241 S; 328/67; 333/13; 361/251
[58] Field of Search ................. 315/241 R, 241 S, 71; 328/67; 333/13; 320/1; 361/251, 257

[56] References Cited

U.S. PATENT DOCUMENTS

| | | | |
|---|---|---|---|
| 3,071,710 | 1/1963 | Fisher | 328/67 |
| 3,514,704 | 5/1970 | Penney | 328/67 |
| 3,571,746 | 3/1971 | DeTemple | 315/241 R |
| 3,633,127 | 1/1972 | Caristi | 315/241 |
| 3,644,747 | 2/1972 | Gray | 328/67 |
| 3,858,147 | 12/1974 | Caddock | 338/62 |
| 3,880,609 | 4/1975 | Caddock | 29/620 |
| 4,092,559 | 5/1978 | Dashuk | 328/67 |

Primary Examiner—Harold Dixon
Attorney, Agent, or Firm—Pretty, Schroeder, Brueggemann & Clark

[57] ABSTRACT

A capacitor discharge apparatus of the kind having a spark gap device for discharging a capacitor to provide a current impulse for conduction through a load. The capacitor and spark gap device both include flat terminals for connecting them directly to a foil strip transmission line. The capacitor is relatively thin and configured such that electrical current flows through it along a short, substantially uni-directional path. The current path of the apparatus is configured such that it retraces itself in a closely-spaced relationship, whereby the magnetic field created by current flowing through each segment of the path is substantially canceled by the magnetic field of the oppositely-directed current flowing through the corresponding, closely-spaced path segment. This substantially reduces the apparatus' inductance, such that it provides an increased peak electrical current and a faster current rise time.

21 Claims, 6 Drawing Figures

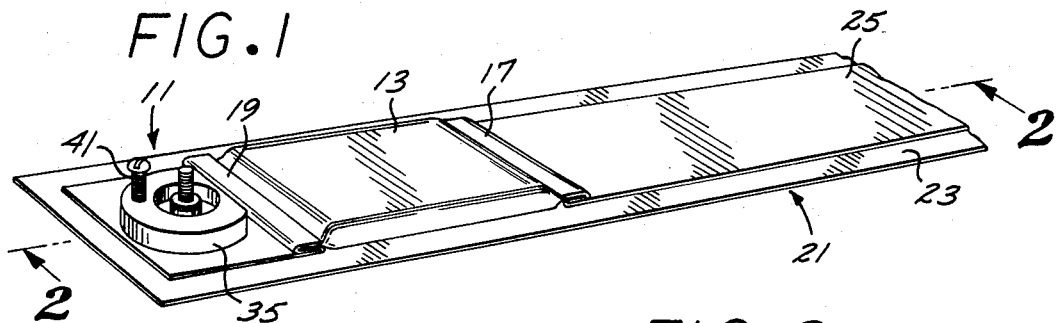
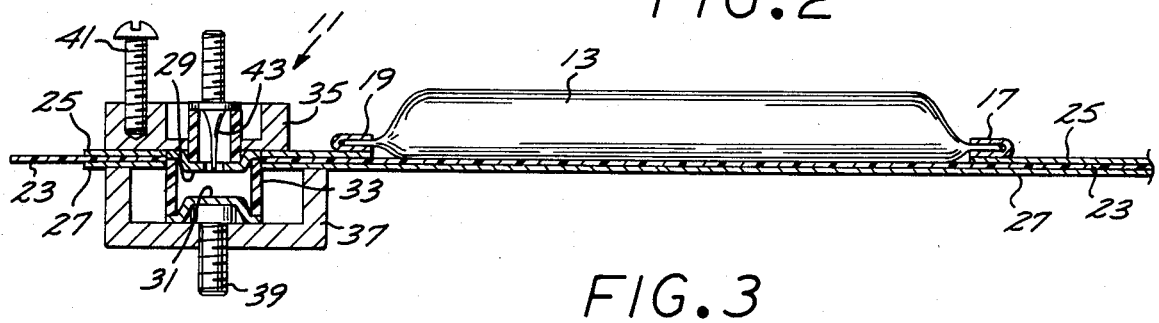
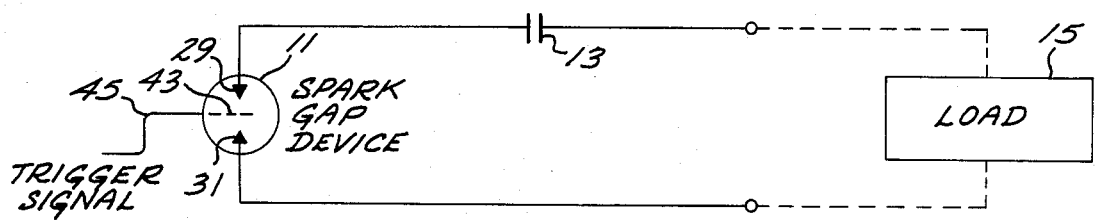
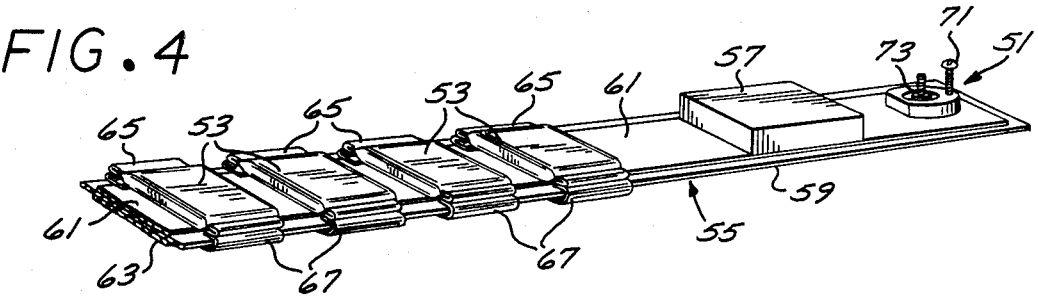
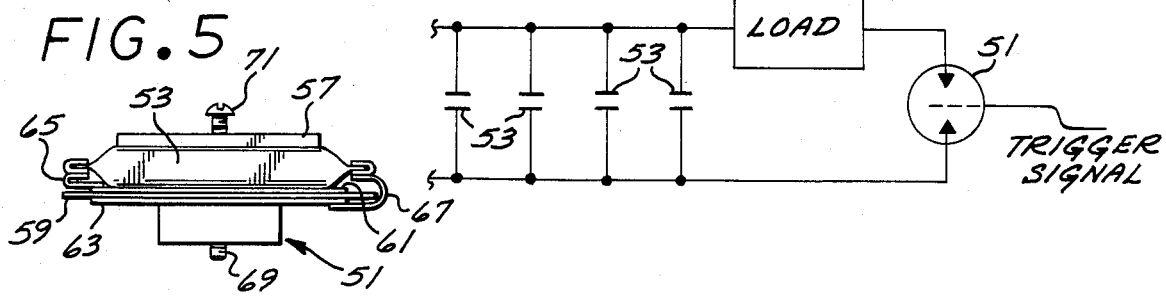

CAPACITOR DISCHARGE APPARATUS

BACKGROUND OF THE INVENTION

This invention relates generally to capacitor discharge apparatus, and, more particularly, to capacitor discharge apparatus of the kind including a spark gap device for discharging a capacitor and thereby supplying a current impulse to a load.

Capacitor discharge apparatus of this particular kind are useful in a number of applications, for providing large electrical current impulses over a relatively short time duration. Examples of such applications are exploding bridge wire and exploding foil initiator detonator systems, high-power, short-duration lasers, flash tubes, and radar systems.

The typical apparatus of this kind includes a capacitor adapted to be charged to a predetermined voltage, and a spark gap device either of the kind having merely two electrodes or of the kind further having a trigger electrode. The capacitor and spark gap device are connected in series via a suitable cable and/or connector, and the resulting assembly includes a pair of terminals adapted for connection to a load. In cases where the spark gap device includes a trigger electrode, the capacitor is charged to the predetermined voltage, after which the device is triggered, to discharge the capacitor across the load. Otherwise, the capacitor is charged until the spark gap device reaches its overvoltage breakdown, at which time the capacitor is discharged across the load.

To maximize the peak current delivered to the load, it is desirable to reduce the series inductance in the various elements of the apparatus. This, in turn, permits the use of a lower capacitance and/or a lower voltage level to achieve the same peak current. Efforts have been made in the past to reduce the inductances of the apparatus' individual elements, particularly the capacitor. However, these efforts have not achieved as large a reduction in the overall inductance of the apparatus as is possible.

It should therefore be appreciated that there is a need for an improved capacitor discharge apparatus that is configured to provide an even greater peak current by minimizing overall inductance even further. The present invention fulfills this need.

SUMMARY OF THE INVENTION

The present invention is embodied in an improved capacitor discharge apparatus of the kind including a capacitor and a spark gap device connected in series with each other. The capacitor is relatively thin and configured such that current flows through it along a short, substantially uni-directional path. A flat terminal projects from each of the capacitor's two ends. The spark gap device includes two spaced electrodes, with a flat terminal electrically connected to each electrode. The spark gap device and capacitor are configured in series with a pair of load terminals, such that actuation of the spark gap device rapidly discharges any electrical charge stored on the capacitor, for conduction through a load connected to the load terminals. A transmission line having an elongated, flat insulator strip and two elongated foil conductor strips located on opposite sides of the insulator strip interconnects the flat terminals of the capacitor and spark gap device and also provides the pair of load terminals adapted for connection to the load. In accordance with the invention, the electrical current path defined by the capacitor, spark gap device and transmission line is configured such that each path segment is located in close proximity to, but in the opposite direction of, a corresponding segment. The electric field created by the current flowing through each such path segment is therefore substantially canceled by the magnetic field created by the oppositely-directed current flowing through its corresponding path segment, thereby significantly reducing the overall inductance of the apparatus such that it provides a correspondingly increased peak electrical current and a faster current rise time.

To minimize inductance in the spark gap device, its two flat terminals preferably are both ring shaped and surround their respective electrodes. At least a portion of the spark gap device extends through an aperture formed at one end the transmission line, with each ring-shaped terminal contacting a separate one of the two conductor strips on the transmission line. The two terminals are preferably coaxial with each other, and the spark gap device further includes means for urging them toward each other, to compressively engage the respective conductor strips.

The capacitor includes a pair of elongated foil strips and a pair of elongated dielectric strips interleaved together and wound into an oblong spiral roll having flat, opposing sides. This configuration has an intrinsically low inductance.

In one embodiment of the invention, the capacitor is mounted on one side of the transmission line, immediately adjacent to the spark gap device. It overlies a gap formed across the entire width of the conductor strip on that side of the line, with its two flat terminals connected to the conductor strip segments on opposite sides of the gap. The load terminals of the apparatus are formed by the conductor strips at the end of the transmission line opposite the spark gap device. The capacitor is relatively thin and has its longitudinal axis aligned with that of the transmission line, so its foil strips are spaced relatively closely to the conductor strip on the opposite side of the transmission line. The capacitor therefore functions much like a mere extension of the conductor strip of that side of the transmission line, with the magnetic field created by its current being canceled by that of the current in the conductor strip on the opposite side of the line. As a result, the inductance of the apparatus is reduced, and a high peak electrical current and faster current rise time achieved.

In a second embodiment of the invention, the spark gap device and capacitor are located at opposite ends of the transmission line and the load terminals are formed from an intermediate portion of one of the line's conductor strips. The capacitor is preferably oriented with its longitudinal axis transverse to the transmission line and with one of its flat terminals connected directly to the conductor strip on the same side of the line and the other flat terminal wrapped around the edge of the line for connection to the other conductor strip. In this embodiment, the capacitor is likewise relatively thin, such that its foil strips are located relatively closely to the conductor strip on the opposite side of the transmission line. The capacitor therefore functions much like an extension of the conductor strip on its side of the transmission line, with its resulting field cancellation effect, to provide a minimum inductance and thus high peak current.

The second embodiment of the invention is particularly suited for use with a plurality of capacitors, arranged in a side-by-side relationship on one or both sides of the transmission line. As many capacitors can be used as are necessary to achieve the capacitance required. This configuration is particularly useful because large capacitances can be used while maintaining the relatively close spacing between the capacitors and the return current on the opposite side of the transmission line. Inductance is thereby minimized.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 1 is a perspective view of a first preferred embodiment of a capacitor discharge apparatus constructed in accordance with the invention;

FIG. 2 is an enlarged side sectional view of the apparatus, taken substantially in the direction of the arrows 2—2 in FIG. 1;

FIG. 3 is a schematic circuit diagram of the apparatus of FIG. 1, shown connected to a suitable load;

FIG. 4 is a perspective view of a second preferred embodiment of a capacitor discharge apparatus constructed in accordance with the invention, this embodiment including a plurality of capacitors and being shown connected to a suitable load;

FIG. 5 is an enlarged left end view of the second preferred embodiment of FIG. 4; and FIG. 6 is a schematic circuit diagram of the apparatus of FIG. 4.

DESCRIPTION OF THE PREFERRED EMBODIMENTS

Referring now to the exemplary drawings, and particularly to FIGS. 1-3, there is shown a first preferred embodiment of a capacitor discharge apparatus in accordance with the invention. The apparatus includes a triggered spark gap device 11 and a single capacitor 13, adapted for connection to a suitable load 15 (FIG. 3, only). In use, the capacitor is charged to a predetermined voltage level using suitable charging circuitry (not shown), after which the spark gap device is triggered to discharge the capacitor and provide an electrical current impulse to the load.

The capacitor 13 is preferably of the kind that includes a pair of elongated foil strips and a pair of elongated dielectric strips interleaved together and wound into an oblong spiral roll having flat opposing sides. Foil terminals 17 and 19 project from each of its two ends. The capacitor has an intrinsically low inductance, as current flows through it along a relatively short and substantially uni-directional path.

In accordance with the invention, the capacitor 13 and spark gap device 11 both have flat electrical terminals and are connected in series with each other and with the load 1 by a foil strip transmission line 21. The capacitor, spark gap device, and transmission line are configured such that the entire electrical current path they provide retraces itself in a closely spaced relationship. The magnetic field created by any current flowing at each segment of the path is therefore substantially canceled by the magnetic field created by the current flowing at the corresponding, closely-spaced segment of the path. This provides the apparatus with an extremely low inductance, such that a high peak current and faster current rise time can be achieved with reduced capacitance and/or voltage levels.

More particularly, the foil strip transmission line 21 includes an elongated, flat insulator strip 23 formed of a suitable dielectric material such as Kapton, with upper and lower foil conductor strips 25 and 27, respectively, secured to its opposite sides. The two conductor strips are preferably of the same width and are coextensive with each other. As shown in FIG. 2, the upper conductor strip includes a gap extending across its entire width, with the capacitor being located immediately over the gap. One of the capacitor's foil terminals 17 is connected to the conductor strip segment on one side of the gap and the other foil terminal 19 is connected to the conductor strip segment on the other side of the gap.

The width of the capacitor 13 and the width of its two foil terminals 17 and 19 are preferably the same as the widths of the upper and lower conductor strips 25 and 27. In addition, the capacitor is preferably as thin as possible, to bring its rolled foil strips as close as possible to the lower conductor strip of the transmission line 21. The capacitor therefore functions much like a mere extension of the upper conductor strip, so as to maximize the field cancellation effect.

One capacitor suitable for use in this embodiment of the invention is described in copending U.S. patent application Ser. No. 521,986, filed on Aug. 11, 1983, in the name of Edgar W. Malone and entitled "Low-Inductance Capacitor." This application is incorporated by reference.

Referring now specifically to FIG. 2, the spark gap device 11 projects through a circular aperture formed through one end of the transmission line 21. The device includes upper and lower coaxial electrodes 29 and 31 spaced a predetermined distance apart from each other by a cylindrical wall insulator 33, along with upper and lower coaxial, ring-shaped terminals 35 and 37 coupled directly to the respective electrodes. The lower terminal is threadedly received on a threaded shaft 39 projecting from the back side of the lower electrode. Rotation of this terminal moves it toward the upper terminal, whereupon they compressively engage the respective lower and upper conductor strips 27 and 25 of the transmission line. The upper conductor is cut away on the side that faces the capacitor 13, to reduce the spacing between them. In addition, a threaded shaft 41 projects from the back side of the upper terminal, for use in charging the capacitor, as will be described below. A trigger electrode 43 located in the middle of the upper electrode is used to trigger a current discharge from one main electrode to the other. The device has an intrinsically low inductance and is particularly suited for connection directly to a foil strip transmission line. It will be appreciated that a similar untriggered overvoltage spark gap device could alternatively be used in the invention.

Another spark gap device suitable for use in this embodiment of the invention is described in detail in copending U.S. patent application Ser. No. 521,985, filed on Aug. 11, 1983, in the name of Edgar W. Malone and entitled "Spark Gap Device." This application is incorporated by reference The end of the transmission line 21 opposite the spark gap device 11 provides a pair of load terminals adapted for connection to the load 15. The load preferably includes a corresponding pair of flat terminals (not shown) for connection directly to the upper and lower conductor strips 25 and 27, respectively, so as to optimize the coupling of the current impulse to it.

In use, the capacitor 13 can be charged to the predetermined voltage using suitable charging circuitry (not shown) connected to the two threaded shafts 39 and 41 projecting from the spark gap device 11. This charging can be accomplished only if the load 15 is connected. Alternatively, the capacitor can be charged by connecting the charging circuitry to the threaded shaft 41 and to the capacitor's foil terminal 17, in which case the load need not be connected.

After the capacitor has been fully charged, appropriate control circuitry (not shown) couples a trigger pulse signal on line 45 to the trigger electrode 43 of the spark gap device, which triggers the device to discharge the capacitor. The resulting current flows from the capacitor along the upper conductor strip 25 to the spark gap device where it passes through to the lower conductor strip 27 and along it to the load 15. From the load, the current flows back along the upper conductor strip to the capacitor. Since substantially the entire current path retraces itself, in close proximity, a cancellation of the magnetic field it creates is achieved. This results in an extremely low series inductance that substantially increases the peak electrical current and speeds up current rise time that the apparatus can provide. This, in turn, permits the use of smaller capacitance and/or voltage values to achieve the same current level, thereby substantially reducing the apparatus' size and cost.

FIGS. 4–6 depict a second preferred embodiment of the invention, this embodiment including a spark gap device 51 and a plurality of capacitors 53, all mounted on a foil strip transmission line 55 adapted for connection to a load 57. The spark gap device and the individual capacitors are the same as those for the embodiment of FIGS. 1–3. The transmission line includes an elongated flat insulator strip 59, with upper and lower foil conductor strips 61 and 63, respectively, secured to its opposite sides.

The capacitors 53 are arranged in a side-by-side relationship on one side of the transmission line 55, with their longitudinal axes perpendicular to that of the transmission line. Each capacitor includes two foil terminals 65 and 67, with one connected to the upper conductor strip 61 of the transmission line and the other wrapped around the line for connection to the lower conductor strip 63. The load 57 is adapted for connection across a gap (not shown) formed in the upper conductor strip, between the spark gap device and the capacitors.

The capacitor discharge apparatus of FIGS. 4–6 is used in the same manner as the apparatus of FIGS. 1–3. In particular, the capacitors 53 can be all charged to a predetermined voltage level using appropriate charging circuitry (not shown) connected to the apparatus via a pair of threaded shafts 69 and 71 located on the spark gap device 51. Triggering the spark gap device using its trigger electrode 73 discharges all of the capacitors through the load 57.

As was the case with the first embodiment, this second embodiment of the invention likewise provides an extremely low inductance by virtue of the current path retracing itself in close proximity, so as to achieve a cancellation of the magnetic field. This embodiment is particularly suited for use with relatively large capacitance values, since the individual capacitors 53 can be added to the end of the transmission line 55 without significantly increasing the series inductance.

It will be appreciated that this second embodiment of the invention can further include a plurality of additional capacitors mounted on the lower conductor strip 63 of the transmission line 55. The current flowing through them will be in close proximity to, and in the opposite direction from, the current flowing through the conductor strip immediately adjacent to them. Accordingly, the same magnetic field cancellation effect will occur, and an extremely low series inductance will be achieved.

It should be appreciated from the foregoing description that the present invention provides an improved capacitor discharge apparatus for use in providing high peak current impulses, with fast rise times, using reduced capacitance and voltage levels. This improvement is achieved by mounting one or more capacitors and a spark gap device directly onto a foil strip transmission line, and by configuring the apparatus such that the current path retraces itself in close proximity, along substantially its entire length. This results in a cancellation of the magnetic field created by the current flowing through each segment of the current path, thereby significantly reducing the apparatus' series inductance such that it provides an increased peak impulse current and a faster current rise time.

Although the invention has been described in detail with reference to the presently-preferred embodiments, it will be understood by those of ordinary skill in the art that various modifications can be made without departing from the invention. Accordingly, the invention is limited only by the following claims.

I claim:

1. A capacitor discharge apparatus comprising:

a flat capacitor having a flat terminal projecting from each of two opposite ends and configured such that electrical current flows through it along a short, substantially uni-directional path;

a spark gap device having two spaced electrodes and two flat terminals electrically connected to the respective electrodes; and a transmission line having an elongated flat insulator strip and two elongated foil conductor strips located on opposite sides of the insulator strip, the transmission line providing two load terminals adapted for connection to a load and connecting directly to the terminals of the capacitor and spark gap device to configure them in series with the two load terminals;

wherein actuation of the spark gap device rapidly discharges any electrical charge stored on the capacitor for conduction through a load connected to the load terminals of the transmission line;

and wherein the electrical current path defined by the capacitor, spark gap device and transmission line is configured such that each path segment is located in close proximity to, but in the opposite direction of, a corresponding path segment, such that the magnetic field created by the current flowing through each path segment is substantially canceled by the magnetic field created by the oppositely-directed current flowing through its corresponding path segment, thereby reducing the series inductance of the apparatus such that it provides a correspondingly increased peak electrical current and a faster current rise time.

2. A capacitor discharge apparatus as defined in claim 1, wherein:
the conductor strip located on one side of the transmission line includes means defining a gap extending across its entire width; and
the capacitor is mounted on the transmission line overlying the gap, with its longitudinal axis substantially parallel to that of the transmission line and with its two flat terminals connected to the conductor strip segments on opposite sides of the gap.

3. A capacitor discharge apparatus as defined in claim 2, wherein the widths of the two terminals of the capacitor are substantially the same as the width of the conductor strip to which they are connected.

4. A capacitor discharge apparatus as defined in claim 1, wherein the capacitor is mounted on the transmission line, with one of its two flat terminals connected to the conductor strip on one side of the line and the other of its terminals connected to the conductor strip on the other side of the line.

5. A capacitor discharge apparatus as defined in claim 4, and further including a plurality of capacitors mounted in side-by-side, transverse relationship on the transmission line, each capacitor with one of its two flat terminals connected to the conductor strip on one side of the line and the other of its terminals connected to the conductor strip on the other side of the line.

6. A capacitor discharge apparatus comprising:
a transmission line having an elongated, flat insulator strip and two elongated foil conductor strips located on opposite sides of the insulator strip;
a spark gap device extending through the transmission line at one of its ends and interconnecting the two conductor strips of the transmission line; and
a flat roll capacitor including a pair of elongated foil strips and a pair of elongated dielectric strips interleaved together and wound into an oblong spiral roll having flat opposing sides, with a flat terminal projecting from each of its two ends;
wherein the conductor strip located on one side of the transmission line includes means defining a gap extending across its entire width, the capacitor being mounted on the transmission line overlying the gap, with its two terminals connected to the conductor strip segments on opposite sides of the gap;
and wherein actuation of the spark gap device rapidly discharges any electrical charge stored on the capacitor for conduction through a load connected between the two conductor strips of the transmission line, with the magnetic field created by the current flowing through the capacitor being substantially canceled by the magnetic field created by the return current flowing on the opposite side of the transmission line, thereby reducing the inductance of the capacitor and transmission line suc that the apparatus provides a correspondingly increased peak electrical current and a faster current rise time.

7. A capacitor discharge apparatus as defined in claim 6, wherein:
the spark gap device includes first and second electrodes spaced a prescribed distance apart from each other, a first ring-shaped terminal interconnecting the first electrode with the conductor strip on one side of the transmission line, and a second ring-shaped terminal interconnecting the second electrode with the conductor strip on the other side of the transmission line;
the transmission line includes means defining an aperture therethrough; and
at least a portion of the spark gap device extends through the aperture in the transmission line.

8. A capacitor discharge apparatus as defined in claim 7, wherein:
the first and second ring-shaped terminals of the spark gap device are coaxial with each other, and located on opposite sides of the transmission line; and
the spark gap device further includes means for urging the first and second ring-shaped terminals toward each other, to compressively engage the respective conductor strips of the transmission line.

9. A capacitor discharge apparatus as defined in claim 6, wherein the capacitor is substantially thinner than the width of the transmission line and is mounted with one of its flat sides in contact with the transmission line, thereby minimizing the spacing between the foil strips of the capacitor and the conductor strip on the opposite side of the transmission line.

10. A capacitor discharge apparatus as defined in claim 9, wherein:
the capacitor is oriented with its longitudinal axis parallel with that of the transmission line; and
the widths of the two flat terminals of the capacitor are substantially the same as that of the conductor strip to which they are connected.

11. A capacitor discharge apparatus as defined in claim 6, wherein the conductor strips of the transmission line have substantially the same width and are substantially coextensive with each other.

12. A capacitor discharge apparatus as defined in claim 6, wherein:
the capacitor is oriented with its longitudinal axis parallel with that of the transmission line; and
the capacitor is mounted on the transmission line immediately adjacent to the spark gap device.

13. A capacitor discharge apparatus comprising:
a transmission line having an elongated, flat insulator strip and two elongated foil conductor strips located on opposite sides of the insulator strip;
a spark gap device extending through the transmission line at one of its ends and interconnecting the two conductor strips of the transmission line; and
a flat roll capacitor located at the end of the transmission line opposite the spark gap device, the capacitor including a pair of elongated foil strips and a pair of elongated dielectric strips interleaved together and wound into an oblong spiral roll having flat opposing sides, with a flat terminal projecting from each of its two ends, each terminal being connected to a separate conductor strip of the transmission line;
wherein one of the conductor strips of the transmission line is adapted for connection to a load;
and wherein actuation of the spark gap device rapidly discharges any electrical charge stored on the capacitor for conduction through the load, with the magnetic field created by the current flowing through the capacitor being substantially canceled by the magnetic field created by the return current flowing on the opposite side of the transmission line, thereby reducing the inductance of the capacitor and transmission line such that the apparatus provides a correspondingly increased peak electrical current and a faster current rise time.

14. A capacitor discharge apparatus as defined in claim 13, wherein:
the apparatus further includes a plurality of flat roll capacitors, each including a pair of elongated dielectric strips interleaved together and wound into an oblong spiral roll having flat opposing sides, with a flat terminal projecting from each of its two ends;
wherein each of the plurality of capacitors is mounted with one of its terminals connected to the conductor strip on one side of the transmission line and the other of its terminals connected to the conductor strip on the other side of the transmission line; and
wherein actuation of the spark gap device rapidly discharges the electrical charge stored on all of the capacitors for conduction through the load, with the magnetic field created by the current flowing through each capacitor being substantially canceled by the magnetic field created by the return current flowing on the opposite side of the transmission line, thereby reducing the inductance of each capacitor such that the apparatus provides a correspondingly increased peak electrical current and a faster current rise time.

15. A capacitor discharge apparatus as defined in claim 14, wherein the plurality of capacitors are mounted side-by-side, transverse relationship on one side of the transmission line.

16. A capacitor discharge apparatus as defined in claim 13, wherein:
the spark gap device includes first and second electrodes spaced a prescribed distance apart from each other, a first ring-shaped terminal interconnecting the first electrode with the conductor strip on one side of the transmission line, and a second ring-shaped terminal interconnecting the second electrode with the conductor strip on the other side of the transmission line;
the transmission line includes means defining an aperture therethrough; and
at least a portion of the spark gap device extends through the aperture in the transmission line.

17. A capacitor discharge apparatus as defined in claim 16, wherein:
the first and second ring-shaped terminals of the spark gap device are coaxial with each other and located on opposite sides of the transmission line; and
the spark gap device further includes means for urging the first and second ring-shaped terminals toward each other, to compressively engage the respective conductor strips to the transmission line.

18. A capacitor discharge apparatus as defined in claim 13, wherein the capacitor is substantially thinner than the width of the transmission line and is mounted with one of its flat sides in contact with the transmission line, thereby minimizing the spacing between the foil strips of the capacitor and the conductor strip on the opposite side of the transmission line.

19. A capacitor discharge apparatus as defined in claim 13, wherein the conductor strips of the transmission line have substantially the same width and are substantially coextensive with each other.

20. A capacitor discharge apparatus comprising:
a transmission line having an elongated, flat insulator strip and two elongated, equal-width foil conductor strips located on opposite sides of the insulator strip, the transmission line having means defining an aperture through it at one of its two ends;
a spark gap device including
first and second coaxial electrodes spaced a predetermined distance apart from each other and located within the aperture formed in the transmission line,
a first ring-shaped terminal interconnecting the first electrode with the conductor strip on one side of the transmission line,
a second ring-shaped terminal coaxial with the first ring-shaped terminal and interconnecting the second electrode with the conductor strip on the other side of the transmission line, and
means for urging the first and second ring-shaped terminals toward each other, to compressively engage the respective conductor strips of the transmission line;
wherein the conductor strip located on one side of the transmission line includes means defining a gap extending across its entire width, the gap being located immediately djacent to the spark gap device; and
a flat roll capacitor including a pair of elongated foil strips and a pair of elongated dielectric strips interleaved together and wound into an oblong spiral roll having flat opposing sides, with a foil terminal projecting from each of its two ends, the capacitor being substantially thinner than the width of the transmission line and being mounted on the transmission line immediately over the gap formed in one of its conductor strips, one of its foil terminals being connected to the conductor strip segment on one side of the gap and the other of its foil terminals being connected to the conductor strip segment on the other side of the gap, wherein one of the flat sides of the capacitor directly contacts the insulator strip of the transmission line exposed through the gap, to minimize the spacing between the foil strips of the capacitor and the conductor strip on the opposite side of the transmission line;
wherein actuation of the spark gap device rapidly discharges any electrical charge stored on the capacitor for conduction through a load connected between the two conductor strips of the transmission line, with the magnetic field created by the current flowing through the capacitor being substantially canceled by the magnetic field created by the return current flowing on the opposite side of the transmission line, thereby reducing the inductance of the capacitor and transmission line such that the apparatus provides a correspondingly increased peak electrical current and a faster current rise time.

21. A capacitor discharge apparatus comprising:
a transmission line having an elongated, flat insulator strip and two elongated, equal-width foil conductor strips located on opposite sides of the insulator strip, the transmission line having means defining an aperture through it at one of its two ends;
a spark gap device including
first and second coaxial electrodes spaced a predetermined distance apart from each other and located within the aperture formed in the transmission line, a first ring-shaped terminal interconnecting the first electrode with the conductor strip on one side of the transmission line, a second ring-shaped terminal coaxial with the first ring-shaped terminal and interconnecting the second electrode with the conductor strip on the other side of the transmission line, and means for urging the first and second ring-shaped terminals toward each other, to compressively engage the respective conductor strips of the transmission line; and a plurality of flat roll capacitors, each including a pair of elongated foil strips and a pair of elongated dielectric strips interleaved together and wound into an oblong spiral roll having flat opposing sides, with a foil terminal projecting from each of its two ends;

wherein the capacitors are mounted directly onto the transmission line, at the end of line opposite the spark gap device, in a side-by-side, transverse relationship, with one foil terminal of each capacitor being connected to the conductor strip on one side of the transmission line and the other foil terminal of each capacitor being connected to the conductor strip on the other side of the line;

wherein one of the conductor strips of the transmission line is adapted for connection to a load;

and wherein actuation of the spark gap device rapidly and simultaneously discharges any electrical charge stored on the plurality of capacitors for conduction through the load, with the magnetic field created by the current flowing through each capacitor being substantially canceled by the magnetic field created by the return current flowing on the opposite side of the transmission line, thereby reducing the inductance of each capacitor such that the apparatus provides a correspondingly increased peak electrical current and a faster current rise time.

* * * * *